April 17, 1928.
H. D. HOFFMEISTER
MUSIC CHART
Filed March 9, 1927
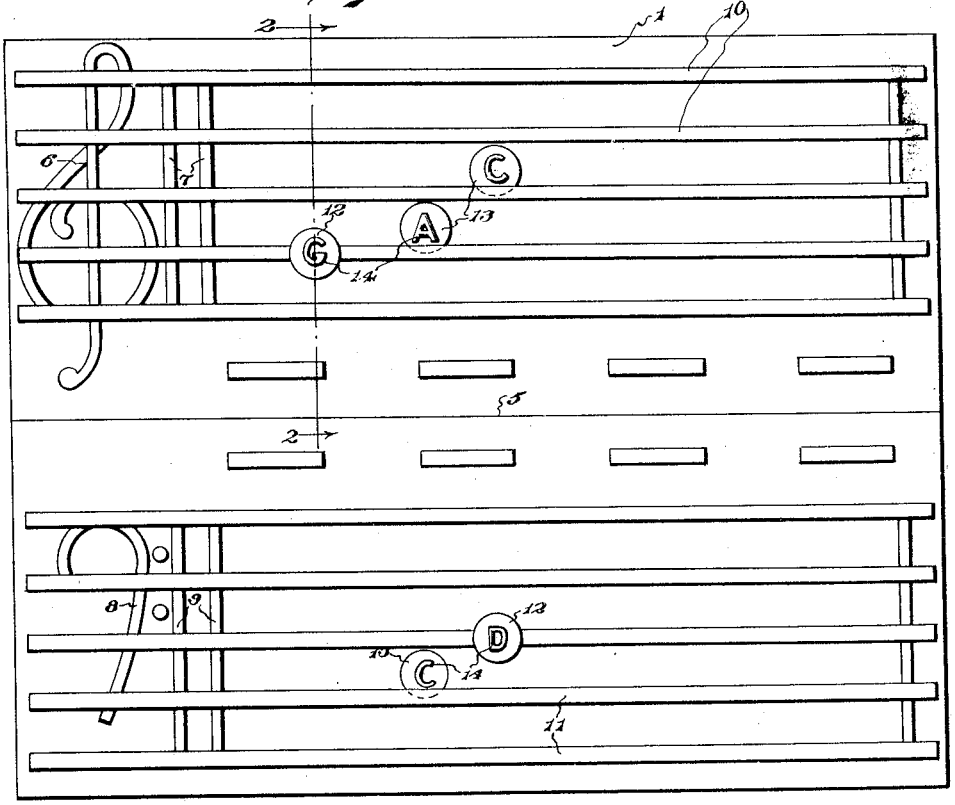
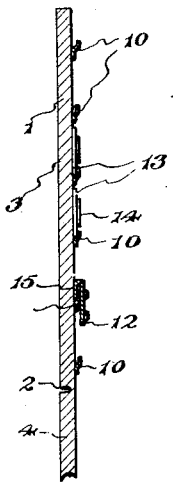
Inventor
H.D. Hoffmeister Patented Apr. 17, 1928.

1,666,382

UNITED STATES PATENT OFFICE.

HALESIA D. HOFFMEISTER, OF LOS ANGELES, CALIFORNIA.

MUSIC CHART.

Application filed March 9, 1927. Serial No. 173,997.

This invention relates to educational apparatus and more particularly to a music sheet by the use of which music may be easily taught to children or blind persons through the tactile as well as the sight senses.

One object of the invention is to provide a music sheet in which the longitudinally extending lines of a staff may serve as carriers for elements representing music notes, symbols, or letters and thereby permit a teacher to selectively apply the notes to the staff lines or spaces according to the exercise or other music composition which it is desired to have a pupil play or sing.

Another object of the invention is to so form the staff lines and elements that the elements may be securely supported either between or upon the lines but easily removed when necessary.

Another object of the invention is to so form the note elements that a blind person may readily read them by placing the ends of the fingers upon the notes.

The invention is illustrated in the accompanying drawing, wherein

Figure 1 is a view showing the improved music sheet in elevation with note elements applied thereto;

Fig. 2 is a sectional view through the music sheet taken on the line 2—2 of Fig. 1;

Fig. 3 is a perspective view looking at the rear face of one of the note elements;

Fig. 4 is a similar view of a modified form of note element, and

Fig. 5 is a perspective view of a note element to be placed between the staff lines.

The music sheet is provided with a backing 1 which may constitute a portion of a blackboard or other similar element having thickness or may consist of a sheet of heavy cardboard or the like adapted to be supported upon an easel, music stand or other suitable support. When so formed, the backing will preferably be reduced in thickness, as shown at 2, thereby providing upper and lower sections 3 and 4 adapted to be folded along the line 5. Upon the upper section a treble cleff 6 and the usual vertically extending measure bars 7 are painted, marked or otherwise applied and upon the lower section a base cleff 8 and vertically extending measure bars 9 are painted, marked or otherwise applied. The longitudinally extending staff lines 10 and 11 may be formed of stiff paper, sheet metal, strips of wood or any other suitable material and are attached to the backing with their lower marginal portions attached to the backing and their upper portions extending in spaced relation thereto, as shown in Fig. 2. The note elements 12 and 13 are in the form of disks of any shape desired having characters 14 provided upon their outer faces, the characters either projecting from the outer faces of the disks, as shown in Fig. 2, or being countersunk therein so that a blind person may read them by placing his fingers against the disks. The note elements 13 which are disposed between the staff lines may be cut from flat cardboard, sheet metal or the like and are of such size and thickness that they may be disposed between the staff lines with their lower portions fitting between the backing and a staff line and supported, as shown in Fig. 2. The note elements 12 which are intended to be placed upon the lines in cross relation thereto are suspended from the staff lines and in order to suspend them each will be provided either with a tongue 15 formed integral with the disk or with a tongue 16 formed as a separate element and mounted between ears 17 carried by the disk, as shown in Fig. 4. It will thus be seen that by this arrangement the note elements may be easily applied and will be well supported either between or upon the staff lines. Therefore, a music teacher may easily arrange the notes according to an exercise or song to be played or sung. These notes may be read either by sight or sense of touch. After a lesson is finished the note elements may be left upon the staves or they may be removed and the music sheet folded and put away until again needed.

Having thus described the invention, I claim:

1. A music chart comprising a backing, strips extending longitudinally thereon in vertically spaced relation to each other and indicating staff lines, said strips having lower marginal portions secured to said backing and upper portions free, and elements provided with note indicating characters and having portions adapted to fit between the backing and free portions of said strips whereby said elements may be supported in cooperating relation to the staff lines formed by the strips.

2. A music chart comprising a backing, strips extending longitudinally thereon in vertically spaced relation to each other and indicating staff lines, said strips having lower marginal portions secured to said backing and upper portions free, and elements provided with note indicating characters, said elements being provided with tongues extending in overlying relation to their rear faces and adapted to engage between the backing and free portions of said strips to suspend the elements from the strips in overlying relation thereto.

3. A music chart comprising a backing, strips extending across said backing in vertically spaced relation to each other to indicate staff lines and having marginal portions spaced from the backing, and note representing elements having portions adapted to be engaged between said backing and the spaced portions of said strips to and removably support the elements.

In testimony whereof I affix my signature.

HALESIA D. HOFFMEISTER. [L. S.]